US012612929B2

(12) United States Patent　　(10) Patent No.:　US 12,612,929 B2
Stafford　　(45) Date of Patent:　　Apr. 28, 2026

(54) DROP-IN SIGNAL ACCUMULATOR PISTON KIT AND METHOD FOR REPLACING AN ORIGINAL EQUIPMENT SIGNAL ACCUMULATOR PISTON

(71) Applicant: Sonnax Transmission Company, Bellows Falls, VT (US)

(72) Inventor: Maura J. Stafford, Warner Robins, GA (US)

(73) Assignee: Sonnax Transmission Company, Bellows Falls, VT (US)

( * ) Notice: Subject to any disclaimer, the term of this patent is extended or adjusted under 35 U.S.C. 154(b) by 0 days.

(21) Appl. No.: 19/096,004

(22) Filed: Mar. 31, 2025

(65) Prior Publication Data

US 2025/0223977 A1　　Jul. 10, 2025

Related U.S. Application Data

(63) Continuation of application No. 18/583,778, filed on Feb. 21, 2024, now Pat. No. 12,313,088, which is a continuation of application No. 17/527,946, filed on Nov. 16, 2021, now Pat. No. 11,933,326.

(60) Provisional application No. 63/115,924, filed on Nov. 19, 2020.

(51) Int. Cl.
*F15B 1/04*　　(2006.01)
*F16H 61/00*　　(2006.01)
*F16H 61/30*　　(2006.01)

(52) U.S. Cl.
CPC ............ *F15B 1/04* (2013.01); *F15B 2201/21* (2013.01); *F15B 2201/31* (2013.01); *F15B 2201/411* (2013.01); *F15B 2201/61* (2013.01); *F16H 61/0009* (2013.01); *F16H 2061/305* (2013.01)

(58) Field of Classification Search
CPC .... F15B 1/04; F15B 2201/21; F15B 2201/31; F15B 2201/312; F15B 2201/405; F15B 2201/4056; F15B 2201/60; F15B 2201/61; F16H 61/0009; F16H 2061/0034; F16H 2061/305; F16J 10/04
See application file for complete search history.

*Primary Examiner* — Matthew Wiblin

(74) *Attorney, Agent, or Firm* — Andrus Intellectual Property Law, LLP

(57)　　　　　ABSTRACT

A drop-in signal accumulator piston assembly to replace an original equipment (OE) signal accumulator piston in a vehicle transmission hydraulic circuit, the OE signal accumulator piston positioned in a bore in a valve body having an open end and a fluid port. The drop-in signal accumulator piston assembly has a sleeve having open first and second ends. The sleeve is configured to be positioned within the bore of the valve body. A piston is positioned in the sleeve. A spring biases the piston towards the fluid port. A plug is positioned to removably retain the sleeve, the piston, and the spring within the bore and to prevent the sleeve from moving axially within the bore.

20 Claims, 6 Drawing Sheets

DROP-IN SIGNAL ACCUMULATOR PISTON KIT AND METHOD FOR REPLACING AN ORIGINAL EQUIPMENT SIGNAL ACCUMULATOR PISTON

CROSS REFERENCE TO RELATED APPLICATIONS

This application is a continuation application of U.S. patent Ser. No. 18/583,778, filed Feb. 21, 2024, which is a continuation application of U.S. patent Ser. No. 17/527,946, filed Nov. 16, 2021, which claims the benefit of U.S. Provisional Patent Application No. 63/115,924, filed Nov. 19, 2020, all of which are incorporated by reference herein in their entireties.

BACKGROUND

The present disclosure relates to a replacement kit for signal accumulator pistons in control solenoid valves in a vehicle transmission, and more particularly to a drop-in kit for replacement signal accumulator pistons in original equipment (OE) control solenoid valve bodies Control solenoids in a vehicle transmission supply control fluid for the proper operation, e.g., shifting, of the vehicle transmission. Proper operation is accomplished by controlling the pressure in and through solenoid valves that control the actuation (engagement and disengagement) of clutches in the transmission. Signal accumulators dampen or smooth out the signal fluid pressure applied from each control solenoid before the fluid flows to a control valve, thus providing for smoother operation of the transmission.

Wear in the signal accumulator piston bores in the control valve body results in loss of the variable force solenoid (VFS) signal pressure. Pressure loss results in poor shift control (soft shifts), no converter apply, hydraulic-related converter warning codes, and burnt clutches.

Accordingly, there is a need for an assembly or kit for replacing the signal accumulator pistons in an OE control solenoid valve body. Desirably, such an assembly can be installed in the OE control solenoid valve body without modification of the valve body. More desirably still such an assembly restores hydraulic control, maintaining proper fluid line pressure control.

SUMMARY

In one aspect of the present disclosure, a drop-in signal accumulator piston assembly replaces an original equipment (OE) signal accumulator piston in an OE vehicle transmission hydraulic circuit. The OE signal accumulator piston is positioned in a bore in a valve body that has an open end and a fluid port.

The drop-in signal accumulator piston assembly includes a cylindrical sleeve having open first and second ends and a piston positioned in the sleeve. A spring is positioned in part in the piston and in part extends beyond an end of the piston. A plug is positioned in the bore adjacent the sleeve. The sleeve is positioned in the valve body bore, with the piston and the spring, and the plug is positioned in the valve body bore to enclose the sleeve, the piston and the spring in the valve body bore.

In embodiments, the piston includes a plurality of circumferential recesses in an outer wall thereof. The plug can include a circumferential recess and further include a seal positioned in the recess. In embodiments, the plug includes an axial through hole.

In embodiments, the piston is cup-shaped, having an open end and a closed end, and the spring is positioned in the open end. An end of the spring can abut an inner end wall of the piston and an opposite end of the spring can abut the plug. The closed end of the piston is proximal the fluid port.

In an aspect, a method for replacing an original equipment (OE) signal accumulator piston in a vehicle transmission hydraulic circuit is disclosed. The OE signal accumulator piston is positioned in a bore in a valve body having an open end and a fluid port.

The method includes removing the OE signal accumulator piston from the bore and installing a cylindrical sleeve having open first and second ends in the bore. The method further includes positioning a piston in the sleeve and positioning a spring in part in the piston and in part extending beyond the piston. The method further includes positioning a plug in the bore. The plug encloses the sleeve, the piston and the spring in the valve body bore.

In methods, the piston includes a plurality of circumferential recesses in an outer wall thereof. In some methods the plug includes a circumferential recess and a seal is positioned in the recess. The plug can include an axial through hole.

The piston can be cup-shaped having an open end and a closed end. The spring can be positioned in the open end such that an end of the spring abuts in inner end wall of the piston and an opposite end of the spring abuts the plug. The closed end of the piston can be proximal the fluid port.

Further understanding of the present disclosure can be obtained by reference to the following detailed description in conjunction with the associated drawings, which are described briefly below.

BRIEF DESCRIPTION OF THE DRAWINGS

An embodiment of a vehicle transmission is disclosed as an example and is not limited by the figures of the accompanying drawings, in which like references may indicate similar elements and in which:

FIGS. 1A and 1B are illustrations of an example of a control solenoid valve body for a vehicle transmission, in which FIG. 1A illustrates the valve body with a cover in place, and FIG. 1B illustrates the valve body with the cover removed;

DETAILED DESCRIPTION

Figure 1A:
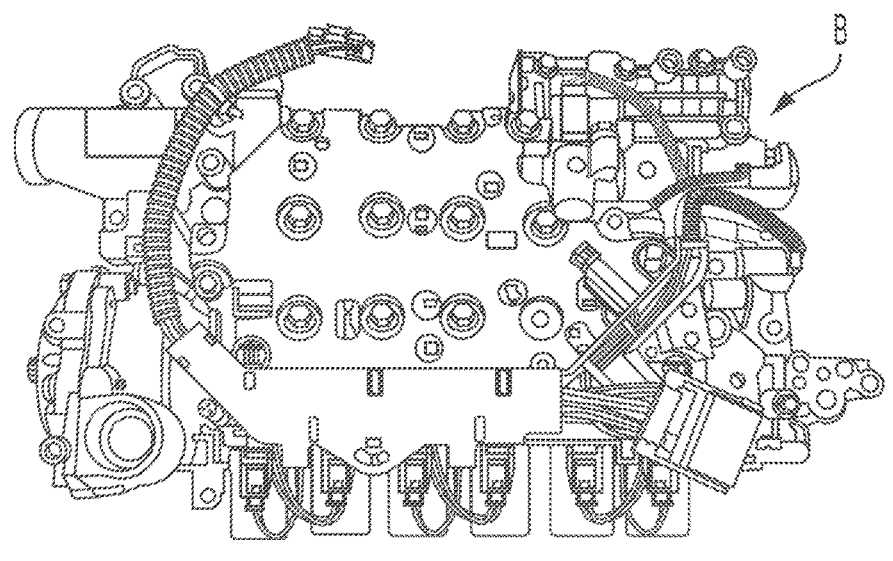

While the present disclosure is susceptible of embodiments in various forms, there is shown in the drawings and will hereinafter be described a presently preferred embodiment with the understanding that the present disclosure is to be considered an exemplification and is not intended to limit the disclosure to the specific embodiment illustrated.

Figure 1B:
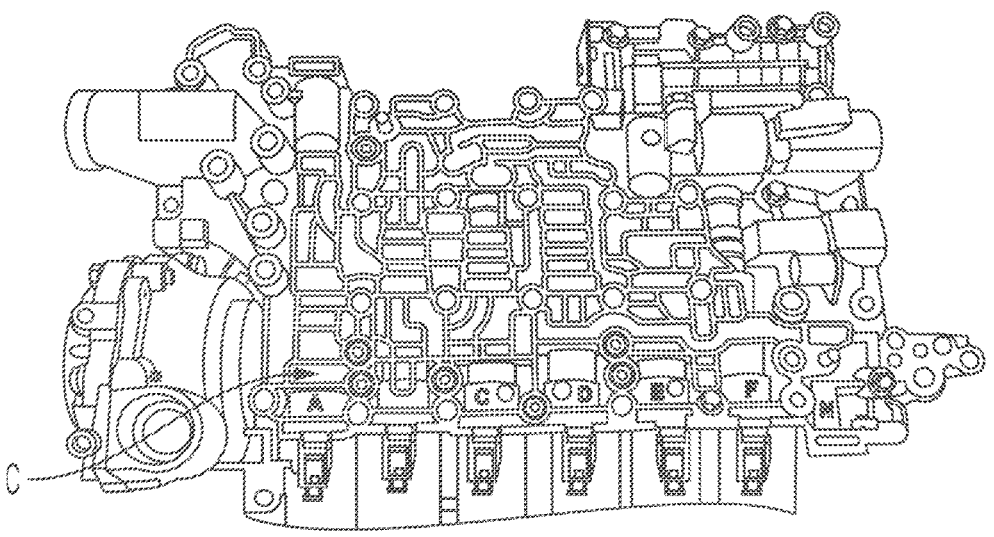
Figure 4:
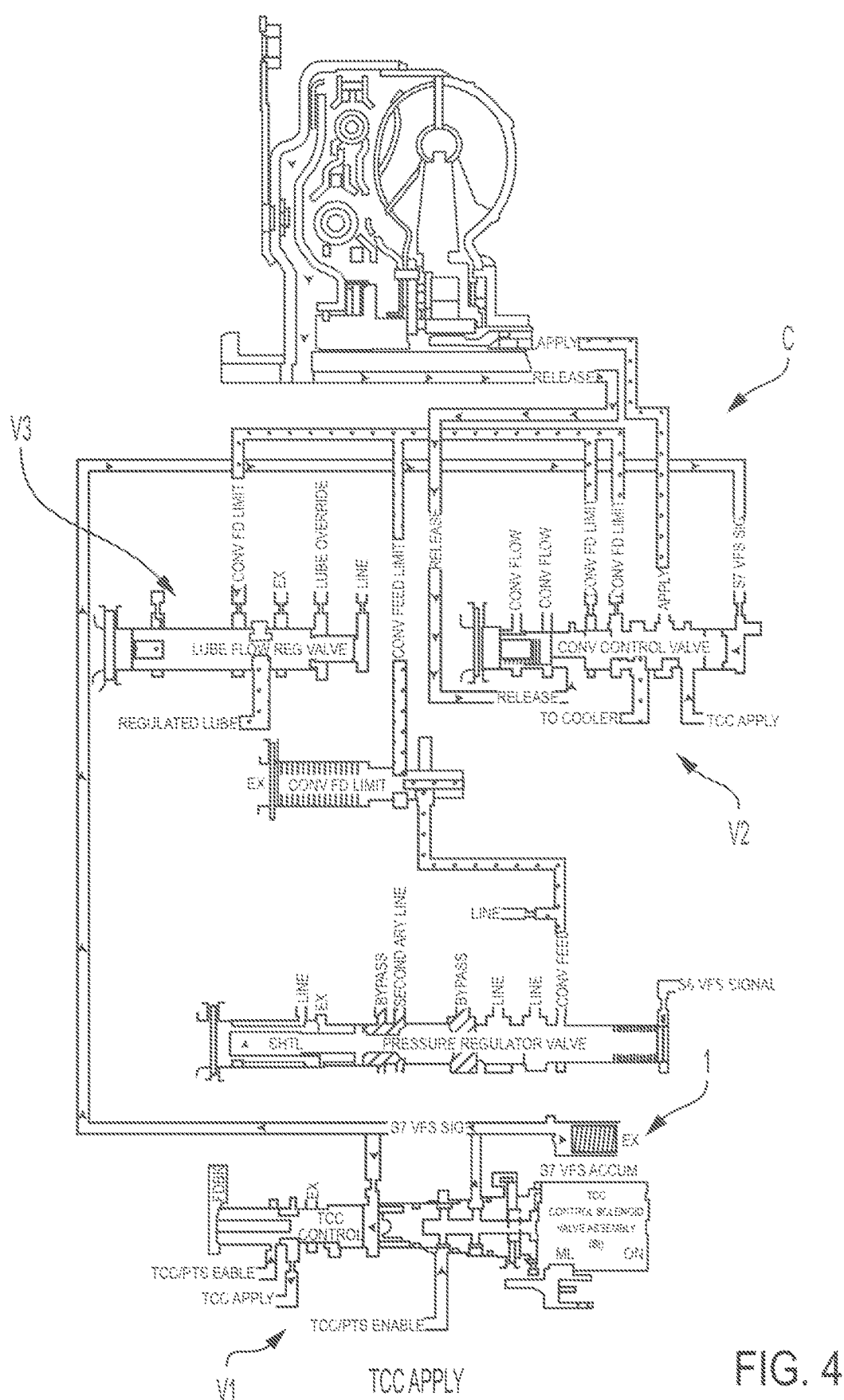
FIG. 4 is an illustration of a portion of a hydraulic control circuit for a vehicle transmission.

Referring briefly first to FIG. 1, there is shown a portion of a control valve body B that houses a hydraulic circuit C for a vehicle transmission. Now referring to FIG. 4, the circuit C includes, among other things, a torque converter clutch (TCC) control solenoid valve assembly VI, a converter control valve assembly V2, and a lube flow regulator valve V3. A signal accumulator I is illustrated associated with the TCC control solenoid valve assembly VI. The components are housing within the control valve body B. It will be appreciated that signal accumulators I are associated with other components within the hydraulic circuit C including, for example, various control circuits for forward and reverse clutch operation.

Figure 3:
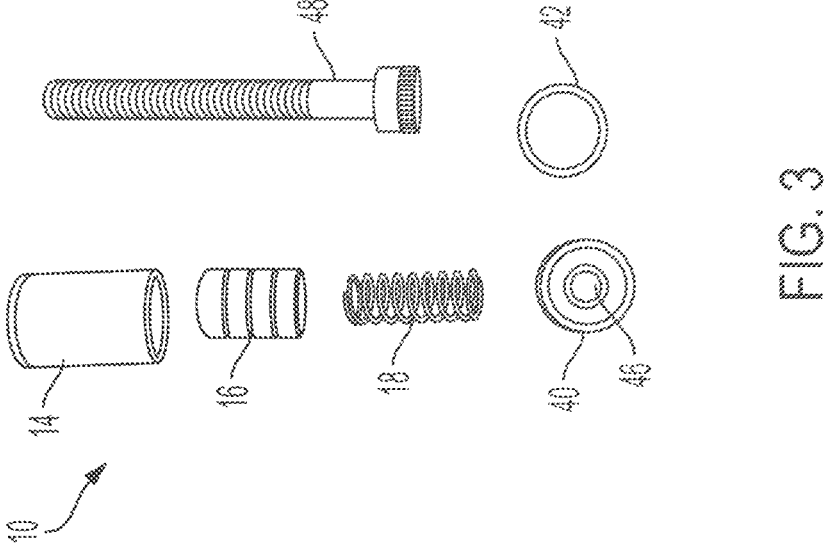
FIG. 3 illustrates various components of the kit.
Figure 2:
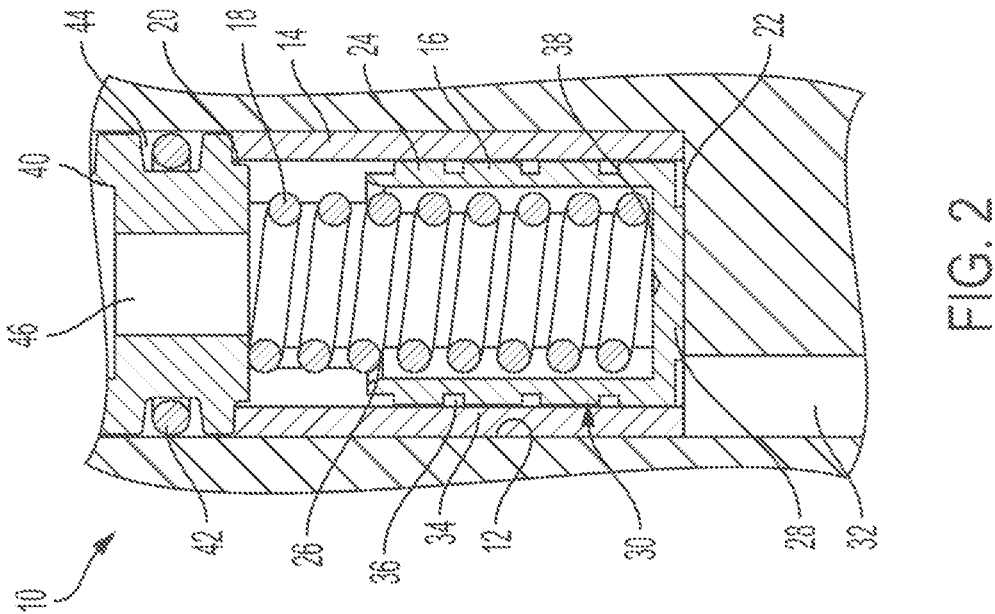
FIG. 2 is an illustration of an embodiment of the replacement accumulator piston kit.

FIG. 2 illustrates an embodiment of the replacement accumulator piston assembly 10 installed in the OE valve bore 12. The assembly 10 includes a sleeve 14 positioned in the OE valve bore 12, a piston 16 positioned in the sleeve 14, and a spring 18 (see FIG. 3) positioned in part in the piston 16 and in part extending beyond the piston 16. In an embodiment, the sleeve 14 has a cylindrical shape with open ends 20, 22. The piston 16 can have a cup-shaped body 30, having a cylindrical wall 24 with one open end 26 and one closed end 28. The spring 18 can be positioned in the piston open end 26 and reside, at least in part, in the piston body 30. The piston 16 is positioned in the sleeve 14 with the piston closed end 28 proximal the valve body port 32 which provides fluid flow into the accumulator bore 12. In an embodiment, an outer wall 34 of the piston 16 has one or more circumferential grooves or recesses 36. In embodiments, the spring 18 abuts an inner end wall 38 of the piston 16.

A plug 40 is positioned to close the bore 12 and a seal 42, such as an O-ring is positioned in a circumferential recess 44 in the plug 40 to seal the accumulator piston assembly 10 in the valve bore 12. A through-hole 46 can be formed in the plug 40 to, for example, allow for readily removing the plug 40 to facilitate removal of the piston 16, spring 18 and/or sleeve 14. The through-hole 46 can be threaded so that a bolt 48 or other threaded tool/element can be threaded into the through-hole 46 for ease of removing the plug 40. The plug 40 is at an end of the valve bore 12 opposite the fluid port 32. The through-hole 46 can also serve as a blow by exhaust for fluid that leaks by the piston 16.

The sleeve 14 is sized to fit into the OE valve bore 12 without modification (e.g., tooling or reaming) of the bore 12. In this configuration, the replacement accumulator piston assembly 10 can readily replace the OE accumulator piston, without modification to the valve body B. The sleeve 14 is fit in the valve bore 12 with a tight tolerance. A locking compound (not shown) may be used to secure or maintain the sleeve 14 in the bore 12.

Tests were conducted to determine whether the smaller diameter replacement piston 16 (and thus smaller volume of the accumulator) has an adverse effect on the function of the accumulator and the hydraulic circuit compared to an accumulator with an OE piston.

Figure 5:
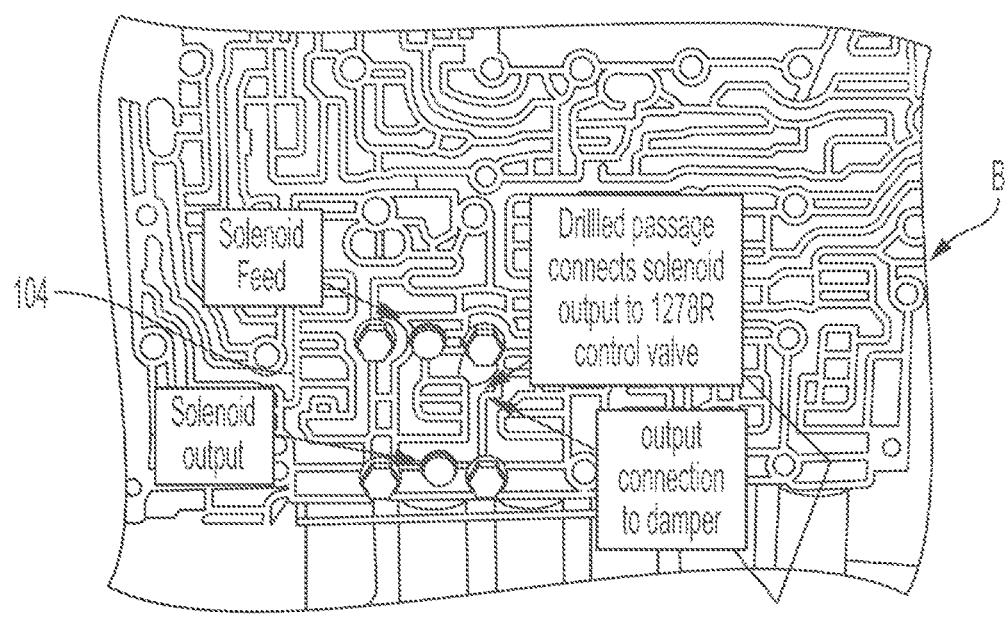
FIGS. 5 and 6 are illustrations of a standard test set up for testing the accumulator.
Figure 6:
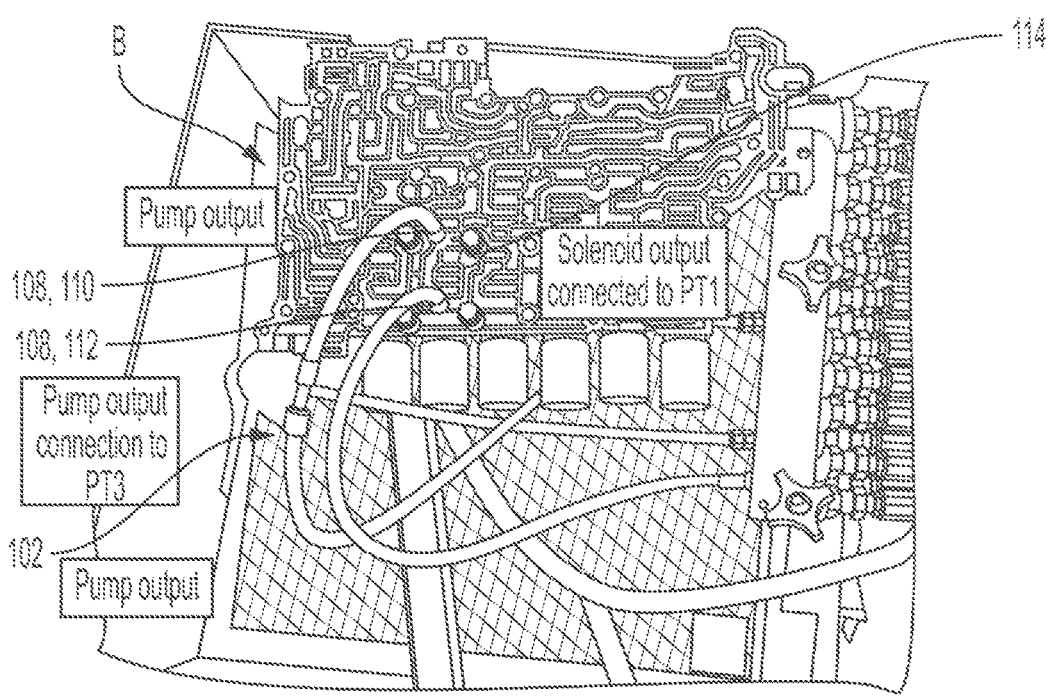

Referring to FIGS. 5 and 6, a test set 102 up was constructed in which an acrylic plate 104 was installed on the back side of a control valve body B. Taps 108 were made in the plate 104 for solenoid feed 110 and solenoid output 112, and solenoid output was connected to the accumulator. Passages were drilled for fluid flow connections 114 from the solenoid to the control valve and signal accumulator piston. A dial indicator (not shown) was installed to monitor the piston stroke via a pin inserted into the spring pocket (i.e., piston open end). This was done for the accumulator with the OE piston and the present drop-in accumulator piston assembly 10.

Figure 7:
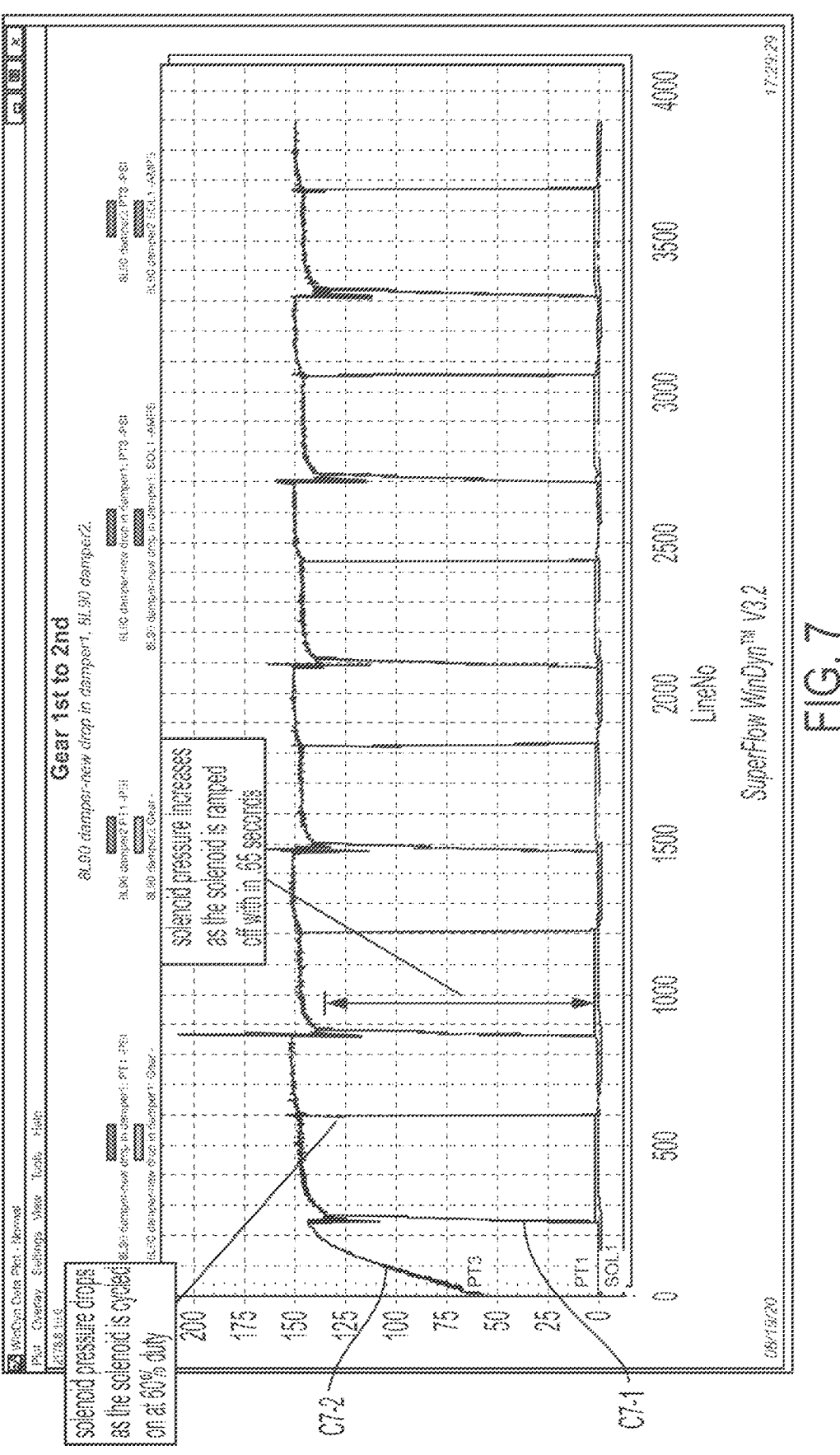
FIGS. 7 and 8 are graphical representations of a comparison of control line signal pressure versus time in an accumulator with the OE piston and in an accumulator with the present drop-in accumulator piston.
Figure 8:
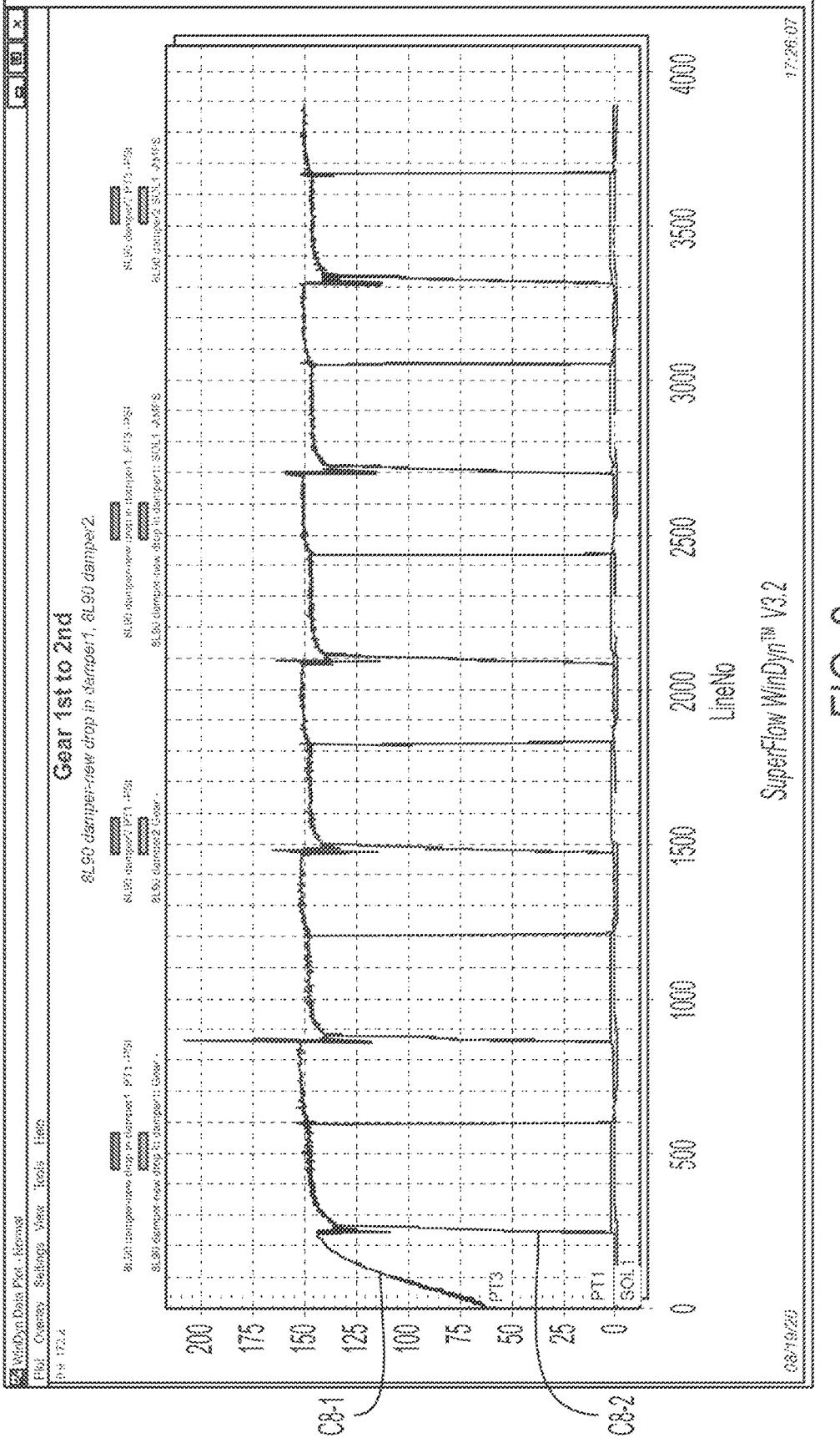

FIGS. 7 and 8 illustrate graphically a comparison of the control line signal pressure versus time with an accumulator with the OE piston and the present drop-in accumulator piston. In FIG. 7 the pump pressure (pressure supplied to the solenoid in psi) is shown on the y-axis and time (in milliseconds) is shown on the x-axis. Curve 7-1 (C7-1) is the solenoid feed/pump pressure in cycling of the normally high solenoid (with a normally high solenoid, the solenoid is electrically actuated and the fluid flow through the solenoid valve decreases with increasing electrical current, conversely with a normally low solenoid, the solenoid is electrically actuated and there is fluid flow through the solenoid valve that increases with increased electrical current). The solenoid was cycled five times.

In FIG. 7, Curve 7-2 (C7-2) shows the solenoid/feed pump pressure flowing to the solenoid. Curve 7-1 (C7-1) shows the flow response/solenoid output pressure as the solenoid is actuated between solenoid duty 0% and solenoid duty at 60%. When the solenoid duty drops to zero (0), the pressure in the system increases (solenoid output increases). The pressure in the system with the OE piston and the present drop-in piston overlap one another in Curve 7-1 (C7-1), and as such it appears as one curve. This shows that the OE accumulator piston and the present drop-in accumulator piston function equally.

FIG. 8 is a repetition of the test results in FIG. 7, with Curve 8-1 showing solenoid feed/pump pressure to the normally high solenoid (C8-1) and Curve 8-2 (C8-2) showing the solenoid output pressure. Again, the solenoid output pressure with the OE piston and the present drop-in piston overlap one another in Curve 8-2 (C8-2), and as such it appears as one curve, and again, this shows that the OE accumulator piston and the present drop-in accumulator piston function equally.

Table 1, below shows a comparison of the OE piston stroke to the present drop-in signal accumulator piston stroke at various solenoid duty percentages which correspond to solenoid output pressure (in psi) during the same tests captured in FIG. 8.

TABLE 1

| Solenoid duty % | Solenoid output (psi) | OE piston stroke | Drop-in piston stroke |
|---|---|---|---|
| 60 | 0 | 0 | 0 |
| 48.9 | 5 | 0.02 | 0.015 |
| 44 | 24 | 0.032 | 0.035 |
| 36.9 | 55 | 0.051 | 0.055 |
| 29 | 88 | 0.072 | 0.075 |
| | 125 | 0.093 | 0.095 |

As can be seen from Table 1, the stroke for the accumulator drop-in piston and the stroke for the accumulator with the OE piston are essentially equal. As such, in viewing the system pressure test results and the piston stroke test results, it can be seen that the present accumulator drop-in piston functions as well as the OE accumulator piston.

A method to correct and/or reduce the wear of an OE control valve body B accumulator piston bore 12 includes removing the OE accumulator piston and spring from the accumulator piston bore 12. The method further includes installing a sleeve 14 in the bore 12, and installing a replacement piston 16 having a cup-shaped body 30 with an open end 26 and a closed end 28 in the sleeve 14. The piston 16 is installed with the open end 26 facing out and the closed end 28 proximal the valve body port 32 into the accumulator bore 12.

A spring 18 is positioned in the piston open end 26 and resides, at least in part, in the piston body 30 and in part extends out of the piston body 30. In methods the piston 16 has one or more circumferential grooves or recesses 36 in an outer wall 34 of the piston 16.

A plug 40 is installed in the accumulator piston bore 12 to enclose the sleeve 14, piston 16 and spring 18 in the bore 12. A seal 42 can be positioned in a circumferential groove or recess 44 in the plug 40. In methods, the plug 40 has an opening, such as a central through-hole 46. The through-hole 46 can be threaded so that a threaded member, such as a threaded tool or bolt 48 can be used to install and/or remove the plug 40. In methods, the through-hole 46 can be used as a vent or blow by exhaust for fluid that leaks the piston 16.

It will be recognized by those skilled in the art that there are numerous vehicle transmissions for which the present drop-in accumulator assembly can be used. In particular, it has been identified that the present drop-in accumulator assembly functions well for certain General Motors transmissions, namely the GM 8L90 and the GM 8L45 transmissions. It is anticipated that the present drop-in accumulator assembly will function well in those transmission control valve that utilize piston-type accumulators to dampen or smooth out the signal fluid pressure in hydraulic systems.

It will be appreciated that the present accumulator drop-in piston restores hydraulic control, maintaining proper fluid line pressure control through an assembly that can be installed in the OE control solenoid valve body. Advantageously, the present drop-in piston accomplishes this without modification of the control valve body, and has been shown to function as well as the larger OE piston and without loss of control signal pressure control.

In the present disclosure, the words "a" or "an" are to be taken to include both the singular and the plural. Conversely, any reference to plural items shall, where appropriate, include the singular. All patents and published applications referred to herein are incorporated by reference in their entirety, whether or not specifically done so within the text of this disclosure.

It will also be appreciated by those skilled in the art that any relative directional terms such as side(s), upper, lower, top, bottom, rearward, inboard, forward, outboard and the like may be for explanatory purposes only and may not be intended to limit the scope of the disclosure.

From the foregoing it will be observed that numerous modifications and variations can be made without departing from the true spirit and scope of the novel concepts of the present disclosure. It is to be understood that no limitation with respect to the specific embodiments illustrated is intended or should be inferred.

What is claimed is:

1. A drop-in signal accumulator piston assembly to replace an original equipment (OE) signal accumulator piston in a vehicle transmission hydraulic circuit, the OE signal accumulator piston positioned in a bore in a valve body having an open end and a fluid port, the drop-in signal accumulator piston assembly comprising:

a sleeve having open first and second ends, wherein the sleeve is configured to be positioned within the bore of the valve body;

a piston positioned in the sleeve;

a spring that biases the piston towards the fluid port; and a plug positioned to removably retain the sleeve, the piston, and the spring within the bore and to prevent the sleeve from moving axially within the bore.

2. The assembly of claim 1, further comprising a seal positioned between the plug and the valve body.

3. The assembly of claim 1, wherein the piston includes at least one circumferential recess in an outer wall thereof.

4. The assembly of claim 1, wherein the plug includes an axial through hole.

5. The assembly of claim 4, wherein the assembly is configured such that fluid may flow to and from the bore only via the fluid port of the valve body and via the axial through hole of the plug.

6. The assembly of claim 1, wherein the piston is cup-shaped having an open end and a closed end, wherein the spring is positioned in the open end.

7. The assembly of claim 6, wherein an end of the spring abuts an inner end wall of the piston.

8. The assembly of claim 6, wherein another end of the spring abuts the plug.

9. A method for replacing an original equipment (OE) signal accumulator piston after removing from a bore in a valve body in a vehicle transmission hydraulic circuit, the OE signal accumulator piston having a first diameter and the valve body having an open end and a fluid port, the method comprising:

installing a sleeve in the bore;

positioning a piston in the sleeve, the piston having a second diameter that is smaller than the first diameter of the OE signal accumulator piston;

positioning a spring in the bore so as to bias the piston toward the fluid port; and at least partially enclosing the bore so as to removably retain the sleeve, the piston and the spring therein and to prevent the sleeve from moving axially within the bore.

10. The method of claim 9, wherein the piston includes at least one circumferential recess in an outer wall thereof.

11. The method of claim 9, wherein the sleeve is positioned radially between the bore and the spring across an entire axial length of the spring.

12. The method of claim 9, wherein the at least partially enclosing the bore comprises positioning a plug in the bore after installing the sleeve in the bore.

13. The method of claim 12, further comprising positioning a seal radially between the plug and the valve body.

14. The method of claim 13, wherein the plug comprises a circumferential recess and the seal is positioned in the circumferential recess.

15. The method of claim 9, wherein the piston is cup-shaped having an open end and a closed end, and wherein the spring is positioned in the open end.

16. The method of claim 15, wherein an end of the spring abuts an inner end wall of the piston.

17. The method of claim 15, wherein the closed end is proximal the fluid port.

18. The method of claim 9, wherein the bore is at least partially closed by positioning a plug in the bore after the sleeve, the piston, and the spring are positioned in the bore.

19. The method of claim 9, wherein the piston is moveable within the sleeve between a first position and a second position, and wherein the sleeve is positioned radially between the bore and the piston when the piston is in the first position and in the second position.

20. A method for replacing an original equipment (OE) signal accumulator piston after removing from a bore in a valve body in a vehicle transmission hydraulic circuit, the OE signal accumulator piston having a first diameter and the valve body having an open end and a fluid port, the method comprising:

installing a sleeve in the bore;

positioning a piston in the sleeve, the piston having a second diameter that is smaller than the first diameter of the OE signal accumulator piston;

positioning a spring in the bore so as to bias the piston toward the fluid port; and at least partially enclosing the bore to prevent the sleeve, the piston, and the spring from exiting the bore and to prevent the sleeve from moving axially within the bore.

\* \* \* \* \*

8